March 17, 1931.  C. E. NELSON  1,796,803
SAFETY CONNECTION FOR POWER TRANSMISSION
Filed May 19, 1928
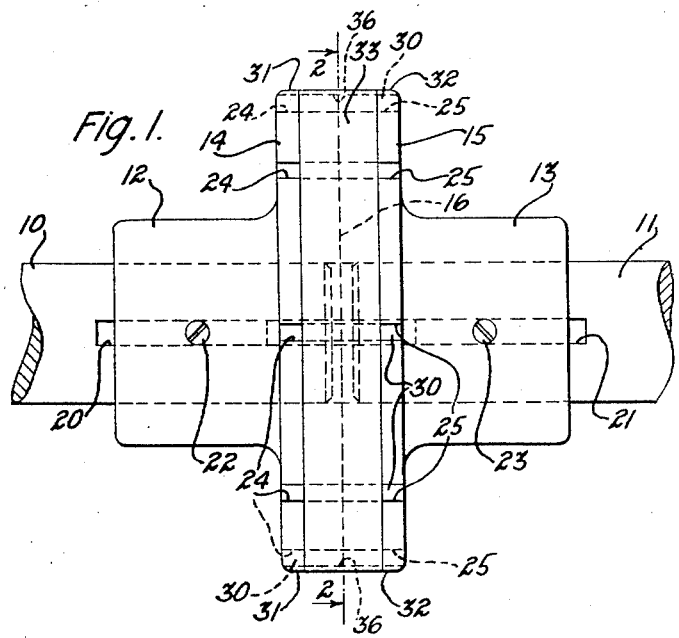
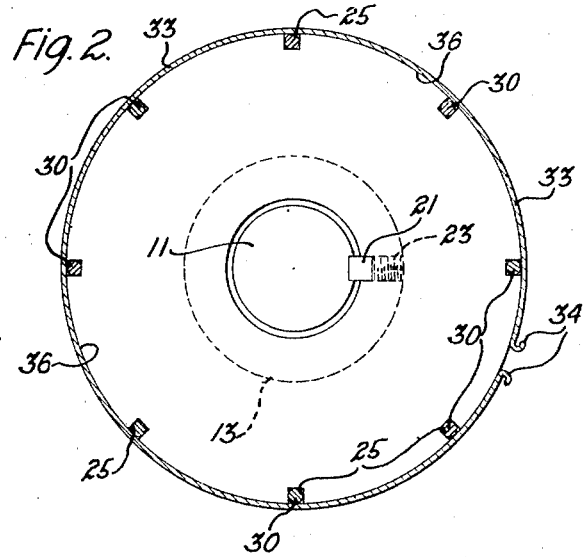
Inventor
Charles E. Nelson
by  Atty.

Patented Mar. 17, 1931

1,796,803

UNITED STATES PATENT OFFICE

CHARLES EDWIN NELSON, OF CHICAGO, ILLINOIS, ASSIGNOR TO WESTERN ELECTRIC COMPANY, INCORPORATED, OF NEW YORK, N. Y., A CORPORATION OF NEW YORK

SAFETY CONNECTION FOR POWER TRANSMISSION

Application filed May 19, 1928. Serial No. 279,034.

This invention relates generally to a safety connection for power transmission and more particularly to a safety connection for power driven shafts disposed in alignment.

In connection with power driven shafts it is often desirable to have a safety connection interposed between the driving and driven shafts which will release the driven shaft in case it encounters some obstruction or other abnormal load.

An object of this invention is to provide a safety driving connection which may be quickly and conveniently restored upon becoming ineffective due to an abnormally loaded driven shaft.

In accordance with the general features of the invention there are provided abutting flanges longitudinally adjustable on adjacent ends of the shafts, transverse peripheral grooves being provided in the flanges for receiving shear pins which are held in position by means of a spring collar surrounding the periphery of the flanges. The spring collar serves as a means for permitting quick replacement of the pins when sheared and the connection may be readily adjusted for different loads by changing the number or size of the pins.

A clear understanding of the invention may be had from the following detailed description, reference being had to the accompanying drawing, wherein, Fig. 1 is a side elevation of the safety connection, embodying the invention, and Fig. 2 is a cross-sectional view thereof taken on line 2—2 of Fig. 1.

Referring now to the drawings in detail in which like numerals designate like parts throughout the several views, there are disclosed aligned shafts 10 and 11, either of which may be the driving shaft, and secured to the adjacent ends of the shafts are two cylindrical hubs 12 and 13 provided with abutting flanges 14 and 15. Keys 20 and 21 and screws 22 and 23 co-operating therewith respectively secure the hubs to the shafts and permit longitudinal adjustment thereon. A plurality of corresponding transverse peripheral grooves 24 and 25 are provided in the flanges 14 and 15 for receiving shear pins 30 which are of such a size and possess such a shearing strength as to become sheared at some predetermined torque occurring when an obstruction or predetermined load is encountered by the apparatus operated by the driven shaft. The shear pins 30 may be circular or rectangular in cross-section but are preferably of substantially the same width on the grooves 25 so that they will remain placed in the grooves while the safety connection is being assembled and will prevent any rotative movement of one flange with respect to the other flange, although the thickness of the pins, in the event that they are rectangular, may be permitted to be less than the depth of the grooves. The pins 30 are preferably composed of brass because of its low shearing resistance, and the number of pins used may be varied to correspond to the torque to be encountered in the operation of the safety connection.

Small circumferential ridges 31 and 32 are provided on the flanges 14 and 15, respectively, forming a peripheral groove 36, and a spring collar 33, possessing tips 34 as an aid in removal thereof, is fitted within the groove 36 for retaining the shear pins 30 in operative position.

When the pins 30 become sheared due to some obstruction to the driven shaft causing an excessive torque therein the safety connection may be quickly and conveniently restored for operation by removing the spring collar 33 and replacing the sheared pins with new ones. The alignment of the corresponding pin retaining grooves 24 and 25 may be readily accomplished as they are exposed to view on the peripheries of the flanges. The pins preferably being of substantially the same size as the grooves, as before stated, frictionally hold themselves therein until the collar 33 is replaced for operation. Another method of replacing the sheared pins consists in forcing the spring collar 33 around the perpheral groove 36 to bring the space between the tips 34—34 of the collar 33 over a pin, when the pin may be removed and a new one inserted.

The invention is particularly useful in connection with material forming apparatus of the forming roll type such as disclosed in the copending application of Charles E. Nelson et al. Serial No. 197,651 filed June 9, 1927. Machines of this type are capable of extremely large output and therefore a delay in restoring the driving connection upon its being broken due to such causes as a jamming of the rapidly fed parts or a similar obstruction, results in a correspondingly great loss of output. It is an important feature of this invention that the driving connection disclosed is sensitive to predetermined overloads and when the connection is broken it can be restored in a very short time.

The above description in connection with the accompanying drawing presents one embodiment of a simple safety connection for aligned driving shafts which may be quickly and easily reconnected in case it is broken by excessive strain in a part. It is, of course, to be understood that the invention is not limited to the one embodiment, but is susceptible of various modifications within the scope of the appended claims.

What is claimed is:

1. In a safety connection for power transmission, aligned shafts provided with end flanges in abutting relation and having corresponding transverse peripheral grooves, members adapted to be placed in said grooves, and means coaxial with the shafts and resiliently engaging the members for preventing accidental displacement thereof.

2. In a safety connection for power transmission, aligned shafts provided with end flanges in abutting relation and having corresponding transverse peripheral grooves, members adapted to be sheared at a predetermined stress placed within the grooves, and a resilient member engaging the peripheries of the flanges for retaining the members in the grooves.

3. In a safety connection for power transmission, aligned shafts provided with end flanges in abutting relation and having corresponding transverse peripheral grooves, members adapted to be sheared at a predetermined stress placed within the grooves, circumferential ridges extending from the end flanges to provide a peripheral groove, and a retaining spring collar fitting within the peripheral groove for securing the shearing members in the aforementioned transverse grooves.

4. In a safety connection for power transmission, aligned shafts provided with end flanges in abutting relation and having corresponding transverse peripheral grooves, pins of uniform diameter frictionally fitting within the grooves, circumferential ridges extending from the end flanges to provide a peripheral groove, and a resilient collar slidable over the flanges and fitting within the peripheral groove for retaining the pins within the aforementioned transverse grooves.

5. In a safety connection for power transmission, driving and driven shafts disposed in axial alignment and provided with end flanges in abutting relationship, said flanges having corresponding transverse peripheral slots, means operatively interconnecting the shafts comprising a driving element disposed within the slots and adapted to be sheared upon a predetermined driving torque, and a retaining member coaxial with the shafts and substantially encircling the end flanges thereof for preventing accidental displacement of the driving element.

6. In a safety connection for power transmission, driving and driven shafts disposed in axial alignment and provided with end flanges in abutting relationship, said flanges having corresponding transverse peripheral slots, means operatively interconnecting the shafts comprising a readily replaceable driving element disposed within the slots and adapted to be sheared upon a predetermined driving torque, and a readily removable retaining member coaxial with the shafts and normally engaging the driving element for preventing accidental displacement and permitting readily replacement of the driving element.

In witness whereof, I hereunto subscribe my name this 1st day of May A. D., 1928.

CHARLES EDWIN NELSON.